April 10, 1973   J. E. PELHAM   3,726,649

DEMAND GAS GENERATOR SYSTEM USING SOLID PROPELLANT

Filed Nov. 11, 1971

INVENTOR.
Joseph E. Pelham
BY
Edward E. McCullough
AGENT

United States Patent Office 3,726,649
Patented Apr. 10, 1973

3,726,649
DEMAND GAS GENERATOR SYSTEM USING
SOLID PROPELLANT
Joseph E. Pelham, Brigham City, Utah, assignor to
Thiokol Chemical Corporation, Bristol, Pa.
Filed Nov. 11, 1971, Ser. No. 197,902
Int. Cl. B01j 7/00
U.S. Cl. 23—281     4 Claims

ABSTRACT OF THE DISCLOSURE

A gas generator using concatenated, solid propellant charges into an orificed pressure vessel, the pressure vessel being equipped with a pressure transducer connected to an electrical switch for automatically firing as many propellant charges as are necessary to create a predetermined gas pressure within the pressure vessel, and valve means on the orifice of the pressure vessel for withdrawing an instant supply of gas at a known pressure for operation of any of a variety of secondary devices. Optional items are a pressure regulator in tandem with the valve means on the outlet orifice, and a pressure release valve to prevent overpressurization of the pressure vessel.

CROSS REFERENCE TO RELATED APPLICATIONS

This invention is related to that of a copending application for patent, owned by the same assignee, titled "Demand, Solid-Propellant, Gas Generator" by J. E. Pelham and A. R. Osburn.

BACKGROUND OF THE INVENTION

This invention relates to demand gas pressure systems, and particularly to such systems using concatenated components of solid propellant, which may provide an instant supply of gas at a desired pressure. The invention herein described was made in the course of or under a contract with the U.S. Air Force.

This invention is essentially an improvement on that in my cited, cross-referenced application. In that invention, the pressure vessel housed the complete propellant grain, which was composed of wafers of solid propellant that could be burned serially as needed to maintain a desired gas pressure within the pressure vessel. Although this invention is useful in effectively providing an instantaneous supply of gas at a desired pressure, it contains a fixed supply of propellant, and, hence the weight of the system is rather inflexible regardless of the quantity of propellant needed for a given mission. As a result some of the propellant is usually wasted, since more of it is supplied than needed. This adds more weight than necessary to the total system. Also, since the combustion chamber contains the total propellant grain, the chamber is gradually enlarged as the propellant is consumed. Therefore, to maintain a given pressure within the pressure vessel, a progressively greater amount of propellant has to be burned to maintain a given, constant pressure within the progressively enlarging combustion chamber. This also constitutes a certain waste of propellant.

SUMMARY OF THE INVENTION

The present invention, which overcomes these disadvantages in the prior art, uses an unpressurized supply of propellant, in the form of concatenated components of solid propellant that may be fired serially and their gases exhausted into an orificed pressure vessel of a fixed size. This pressure vessel is equipped, as was my previous invention, with a pressure transducer that could monitor the pressure within the pressure vessel and automatically cause propellant charges to be fired in sufficient quantity to bring the chamber pressure to a predetermined level. It also has a valve means on the orifice for withdrawing the gases for use in secondary devices, a pressure regulator for metering gases through this valve at a desired pressure, and, optionally, a pressure release valve to prevent overpressurization of the pressure vessel. The total system is no heavier than is necessary to accomplish any given mission, because: (1) Since the size of the pressure vessel remains constant throughout the mission, the rate of propellant use required to provide a given pressure therein also remains constant; and (2) the total amount of propellant to be included in any given missile is variable and can be the minimum amount needed for a specific mission.

Reaction motors using concatenated propellant charges capable of exhausting gases into space directly through thrust nozzles are known and are described in several U.S. patents, such as 3,210,931 to E. E. Elzufon et al.; 3,302,568 to R. E. Biehl; 3,316,719 to J. F. Loprete; 3,328,962 to A. De Feo et al.; 3,328,963 to G. Kraus; 3,460,349 to R. E. Biehl. Somewhat similar devices are set forth in 3,283,501 to W. R. Peterson. A magazine system for the propellant charges for such devices is described in 3,456,445 to M. Bentle et al.

Objects of the invention are to provide a gas generator system capable of delivering an instantly-available supply of gas at a desired pressure and for as long as necessary, the weight of which system may be varied and minimized for any given mission. Important features of the invention are: (1) The size of the pressure vessel may be kept to a uniform, minimal diameter just large enough to provide an instant, nonfluctuating flow of gas regardless of the length of the mission; and (2) since the propellant supply may be shipped and stored separately from the rest of the equipment, handling and storing of both may be greatly facilitated. The propellant which in some instances may be considered somewhat hazardous, is minimized in bulk during handling and storage, since this bulk need not include that of the rest of the equipment.

Other objects and advantages of the invention will become apparent as the following detailed description is read with reference to the accompanying drawings, wherein the same parts are designated with the same characters throughout the disclosure.

DESCRIPTION OF THE PREFERRED EMBODIMENTS

Figure 1:
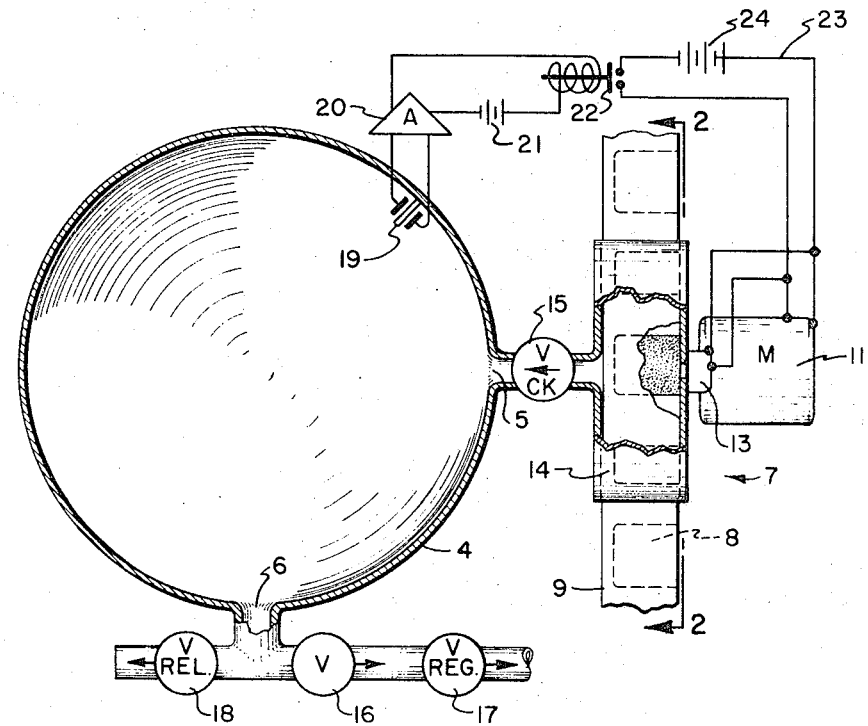
FIG. 1 is a largely-schematic diagram of the invention system.
Figure 2:
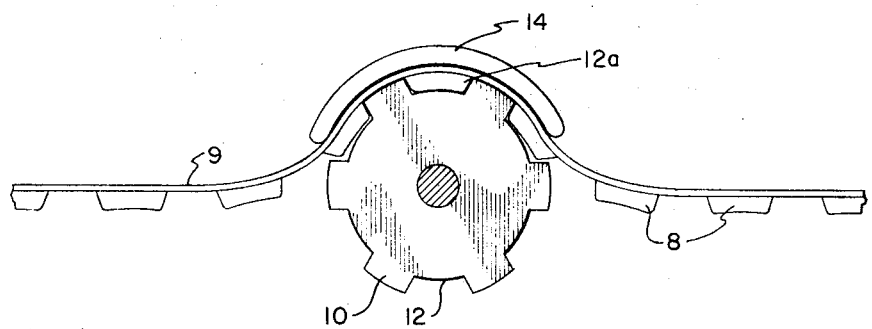
FIG. 2 is a view taken on line 2—2 of FIG. 1.

As shown in FIG. 1, a pressure vessel 4 has an inlet orifice 5 and an outlet orifice 6. A propellant firing apparatus 7 is capable of serially firing concatenated components 8 of solid propellant. In the embodiment shown, the components 8 of propellant are bonded to a flexible tape 9, which may be rolled or folded and stored in magazines not shown. As shown in FIG. 2, positioning means in the form of a wheel 10, operated by an electric step motor 11, has recesses 12 in its periphery that fit the components 8 of propellant. An electric, repeating igniter 13 is positioned at one end of the topmost recess 12a and may ignite the component of propellant in that position on command. A pressure plate 14 of arcuate cross section, together with the topmost recess 12a of the wheel 10 and the igniter 13, forms a housing in sealed relationship with the inlet orifice 5 of the pressure vessel. This housing serially encloses each propellant component at the time of its firing and provides a gas tight combustion chamber therefor. A one-way check valve 15 at this inlet orifice permits unidirectional flow of gases from the propellant into the pressure vessel 4 and prevents flow of gas outward therefrom. Hence, the propellant firing apparatus 7 need not be gas tight or in sealed relationship with the orifice 5 except at the time of firing a propellant component.

The outlet orifice 6 is equipped with a valve 16 that on command may permit flow of gases from the pressure vessel into any devices operable thereby. A pressure regulator 17 in tandem with the valve 16 meters the gases at any desired pressure; and a pressure relief valve 18 prevents overpressurization of the vessel 4. A pressure transducer 19, such as a piezoelectric crystal, is connected to an amplifier 20, a battery or other source of electrical energy 21, and a relay or solenoid switch 22. When the gas pressure in the pressure vessel 4 falls below a predetermined minimum, the transducer 19 produces an electric signal that is amplified and energized sufficiently by the amplifier 20 and the battery 21 to operate the switch 22. This, in turn, closes a circuit 23 in which the step motor 11 and the igniter 13 are connected in parallel with a second battery or energy source 24. This causes the step motor to position the next unburned component of propellant between the igniter 13 and the inlet orifice 5 of the pressure vessel and causes the igniter to ignite that particular component. This burning of propellant components may continue automatically until the gas pressure within the pressure vessel 4 has reached a predetermined level; so that gas at a desired pressure is always immediately available through the outlet orifice 6 for operation of secondary devices such as attitude control means for rocket vehicles.

All of the components in the present invention are well known in the art, and the invention may be made with established technology. The pressure vessel 4 is preferably spherical in shape and is made of wrapped fiber glass impregnated with a suitable resin such as epoxy or polyester. However, it may also be made of steel or other materials that may contain the desired pressure with a minimum of weight. The propellant components may be made of any of the common solid propellants used in rockets or gas generators. Similarly, the material for the tape 9 may be any common, flexible, nonporous material that will provide a gas tight seal with the wheel 10 and the pressure plate 14. The propellant firing apparatus 7 is also well known in the art and is described in several of the patents cited herein.

An invention has been described that provides an advance in the gas generator art, and that is particularly useful in the control of rocket propelled vehicles. Although the embodiment described has been specific with regard to detail, it should be noted that many details may be altered without departing from the scope of the invention as it is defined in the following claims.

The invention claimed is:

1. A gas generator system comprising:
   a pressure vessel having an inlet orifice and an outlet orifice;
   a propellant firing apparatus capable of serially burning concatenated components of solid propellant, comprising an orificed housing in which a selected propellant component is enclosed at the time of its firing, the orifice of the housing being in sealed relationship with the inlet orifice of the pressure vessel at the time of firing; an igniter in the housing for igniting the propellant, the igniter being responsive to an electrical signal; and positioning means for positioning the next unburned propellant component adjacent the igniter after a propellant component has been burned;
   a source of electrical power;
   a pressure transducer in communication with the interior of the pressure vessel and electrically connected to the power source and to the igniter for firing propellant components when gas pressure within the pressure vessel falls below a predetermined pressure level; and
   valve means on the outlet orifice of the pressure vessel for allowing gas to flow therefrom into other devices.

2. The gas generator system of claim 1 further including a one-way check valve on the inlet orifice of the pressure vessel, so that gases may not escape therefrom when a new propellant component is moved into position relative thereto.

3. The gas generator system of claim 1 further including a pressure regulator on the outlet orifice of the pressure vessel in tandem with the valve means thereon, to permit metering of gases therethrough at desired pressures.

4. The gas generator system of claim 1 further including a pressure relief valve in communication with the interior of the pressure vessel to prevent overpressurization thereof.

References Cited

UNITED STATES PATENTS

| | | | |
|---|---|---|---|
| 3,210,930 | 10/1965 | Leeper et al. | 60—250 X |
| 3,210,931 | 10/1965 | Elzufon et al. | 60—250 |
| 3,436,191 | 4/1969 | McGoff et al. | 23—281 |
| 3,460,349 | 8/1969 | Biehl | 60—250 X |

JAMES H. TAYMAN, JR., Primary Examiner

U.S. Cl. X.R.

23—252 R; 102—37.5; 222—3; 60—250